United States Patent Office 3,122,565
Patented Feb. 25, 1964

3,122,565
PURIFICATION PROCESS OF TOCOPHEROL
CONTAINING MATERIALS
Shizumasa Kijima, Nakayama-cho, Ichikawa, Koji Naito,
Bunkyo-ku, Tokyo, and Takajiro Mori, Suginami-ku,
Tokyo, Japan, assignors to Eisai Co., Ltd., Tokyo,
Japan, a corporation of Japan
No Drawing. Filed Oct. 19, 1961, Ser. No. 146,334
Claims priority, application Japan, Oct. 22, 1960
5 Claims. (Cl. 260—345.6)

This invention relates to a process for purifying tocopherol containing materials.

Tocopherols are widely used for their antioxidant and vitamin E activity. They are of great value in foods, feeds and medicinals since they exert their antioxidant and vitamin E activity therein. They are found widely in natural source materials, especially in vegetable oils, such as soybean oil, wheatgerm oil, cotton seed oil, corn oil and the like. They are also found in substantial amounts in deodorizer sludges, which are waste by-products obtained by carrier gas deodorization treatment of vegetable and anmial oils which contain tocopherols.

However, natural vegetable oils contain only minute amounts of tocopherols, even such oils as wheatgerm oil, soybean oil and cotton seed oil which are considered to be the best sources of tocopherols.

On the other hand the tocopherol contents of deodorizer sludges are many times greater than that of the original crude oils from which they are derived, the range of tocopherol content being from 2 to 10 percent by weight. Deodorizer sludges are, therefore, better sources of tocopherols because they are waste by-products and because they contain relatively large amounts of the tocopherols. However, they can not be utilized in foods, feeds, medicinals and the like, because they also contain undesirable and useless substances such as free fatty acids, sterols, hydrocarbons, waxes, pigments and many other kinds of unidentified, bad-smelling substances.

Therefore, it is most desirable for commercial purposes to separate and concentrate tocopherols from tocopherol containing materials, such as those above mentioned, by an effective and economical purification process.

The present invention has for its object to obtain free tocopherols from vegetable crude oils which contain tocopherols in rather minute amounts from deodorizer sludges derived from crude vegetable and animal oils which contain tocopherols, and also from synthetically and semisynthetically prepared tocopherol products.

Another object of the present invention is to provide inexpensively tocopherol concentrates of high purity. A further object of the present invention is to provide a simple and economical process for separating and concentrating tocopherols from tocopherol containing materials. Other objects of the present invention will be apparent from the following description and claims.

In the following description and claims several preferred embodiments of the invention have been disclosed, but it is to be understood that these are set forth for the purpose of illustration and not in limitation thereof.

These and other objects are accomplished by the process of our present invention which includes subjecting tocopherol containing starting materials, in the case of such materials as crude vegetable and animal oils or deodorizer sludges derived therefrom which contain substantial amounts of free fatty acids, to a pretreatment, such as an alkali refining process and other similar processes, so as to remove free fatty acids from said starting materials or to an esterification pre-treatment so as to convert said free fatty acids into neutral esters. Said pretreated materials or other tocopherol containing materials which do not require pretreatment, such as some synthetically prepared alpha-tocopherol products which contain little or no free fatty acids, are then subjected to a treatment by a basic anion exchange resin after said materials have been dissolved in adsorption solvents as hereinafter described. The free tocopherols and some unidentified acidic impurities are selectively adsorbed on said resin and the other impurities, such as sterols, hydrocarbons, glycerides, higher alcohols, pigments and many other kinds of unidentified neutral and basic substances, are not adsorbed and, thus, are separated from the adsorbed free tocopherois. The adsorbed free tocopherols are then eluted from the basic anion exchange resin by eluants as hereinafter described.

In the present description, the term "tocopherol" or derivatives shall refer to substances which have the biological and physiological activities of vitamin E and antioxidant properties: namely tocol homologues such as alpha-, beta-, gamma-, delta-, epsilon-, zeta- and eta-tocopherols of natural d- and synthetic dl-forms; substituted tocols in which one, two or three of the methyl groups in the 5, 7 and 8 positions of the chroman nucleus of tocol are replaced by a radical or radicals, such as alkyl, haloalkyl, hydroxyalkyl, aminoalkyl, acyl and allyl radicals, and in which the methyl group in the 2 position of the chroman nucleus of the tocol is replaced by a lower alkyl radical, such as ethyl, propyl and butyl; and tocopherol analogous substances such as nor-tocopherol in which the isoprene units in the 2 position of the chroman nucleus are two in number, homo-tocopherol in which the isoprene units are four in number and iso-tocopherol in which a side chain composed of three isoprene units in the tocol is linear. Tocol has the structure of 2-methyl-2-[trimethyltridecyl]-6-hydroxychromane.

Deodorizer sludges used in our invention are also known in the deodorization art as "deodorizer hot-well sudge," "catch-all sludge," "catch basin scum," "hot well scum," "lighter than water scum," "clabber stock," "deodorizer trap oil," "condenser oil" and the like, especially by oil manufacturers, and all such materials containing tocopherols are capable of being used as starting materials in our invention. The term "deodorizer sludges" is used as a generic name throughout the specification and claims to refer to such materials.

We have found that tocopherols may be effectively adsorbed on the basic anion exchange resin from tocopherol containing materials if this operation is performed under the following conditions.

According to our experiments tocopherols are adsorbed effectively on the basic anion exchange resin when the tocopherol containing materials are dissolved in polar organic solvents, such as lower monohydric alcohols, and then are passed into contact with the resin. Any of lower monohydric alcohols containing from one to about six carbon atoms can be employed, such as methyl alcohol, ethyl alcohol, isopropyl alcohol, n-propyl alcohol, isoamylalcohol, n-amyl alcohol, hexyl alcohol and similar monohydric alcohols. Monohydric alcohols having from one to four carbon atoms are preferable. Aqueous polar organic solvents are also effective as adsorption solvents of tocopherols on the basic anion exchange resin if the solubilization potency of said aqueous solvents is adjusted to dissolve substantially all tocopherol containing materials. Also, admixtures of polar organic solvents, such as methyl alcohol-ethyl alcohol, methyl alcohol-butyl alcohol, ethyl alcohol-isopropyl alcohol, methyl alcoholpyridine, ethyl alcohol-picoline etc., can be employed as adsorption solvents for tocopherols on the resin in order to increase the amount of tocopherol containing materials that can be dissolved and to maintain sufficient adsorbability of the tocopherols on the resin.

Tocopherols can ionize in the above mentioned adsorption solvents or solvent systems and have, therefore, the capability of being absorbed by the basic anion exchange resin when dissolved in the said solvents or solvent systems. This is also the case with the active group of the basic anion exchange resin.

No adsorption of tocopherols on the basic anion exchange resins could be observed when absolutely pure, non-polar, organic solvents, such as benzene, toluene, petroleum ether, petroleum benzine, ligroin, isopentane, n-hexane, ethyl ether, isopropyl ether etc., were employed as the adsorption solvent.

However, mixed solvents of a non-polar organic solvent with a polar organic solvent or with an aqueous polar organic solvent may be employed as the adsorption solvent in the present invention. In this case, the nonpolar solvents are used as co-adsorption solvents because they do not effect ionization of the tocopherols and the active group of the basic anion exchange resin, but they dissolve impurities in the tocopherol containing materials, such as triglycerides, diglycerides, monoglycerides, sterols etc. The volume ratio of the non-polar organic solvent to that of the polar organic solvent in a mixed solvent system is selected in accordance with the solubility of tocopherol containing materials in said solvent mixture and with the solubilization powers of the polar organic solvent and the non-polar organic solvent employed. The amount of a polar organic solvent, such as lower monohydric alcohols containing one to three carbon atoms, in a mixed solvent system containing a non-polar organic solvent, such as benzene, toluene, ligroin, isopropylether, is usually above about 40% by volume. If the amount of the polar solvent is under 40% by volume, the adsorption capacity of the basic anion exchange resin for tocopherols decreases very much. A variation in the amount of the non-polar organic solvents in said solvent mixture has only a small effect on the adsorption capacity of tocopherols by the basic anion exchange resin. Polar- and non-polar-organic solvent mixtures are used usually in volume ratios of above said range because most tocopherol containing materials, such as crude vegetable glyceride oils, for example, soybean oil, cottonseed oil, wheat germ oil and corn oil, deodorizer sludges derived from them, and semi-synthetically prepared alpha-tocopherol or alpha-tocopherol intermediates still containing crude oil matters derived from deodorizer sludges after they have been pretreated by the alkali-refining treatment to remove free fatty acids, are soluble in solvent mixtures having proper volume ratios as above explained. Solvent mixtures of polar and non-polar organic solvents are thus used at the desirable volume ratios selected according to the solubility of tocopherol containing materials to be treated, the higher ratios of polar organic solvent to non-polar organic solvent being preferably employed. Said polar- and non-polar organic solvent mixtures have the advantages of ease of separation and recovery of both solvents. For example, benzene-methyl alcohol, benzene-ethyl alcohol, hexane-ethanol etc., may be preferably employed.

Surface active agents, such as actyl dodecanol, which will increase the solubility of tocopherol containing materials in lower monohydric alcohols can be added to the polar organic solvent or to the polar- and nonpolar-organic solvent mixtures described above.

The tocopherol containing materials to be treated are first freed from free fatty acids. The tocopherol containing oil products are then dissolved in a solvent as above explained according to the solubility of the oil. A solution of about between 10 and 70% oil in the solvent is a useful range. The higher portion of this range is economically to be preferred. Lower or higher concentrations can be used.

The oil-solvent mixture is then treated with a basic anion exchange resin. If necessary, prior to the ion exchange treatment, said oil-solvent mixture may be cooled to separate out the sterols present in the oil in order to avoid crystallization of sterols during the ion exchange operation. This can be accomplished in a simple manner by simple filtration, decantation or centrifugal filtration. This operation is usually necessary when lower monohydric alcohols are employed as the adsorption solvent.

The ion exchange resin treatment in the present invention is commonly carried out at room temperature. The preferred range of the treatment temperature is from 10° C. to 40° C. Lower or higher temperatures can be used, the upper temperature limit usually being 60° C.

Strongly basic anion exchange resins are used in the present invention. Strongly basic anion exchange resins are divided into two groups, Type I resins and Type II resins, and both of them effectively adsorb the free tocopherol material.

Any commercially available or experimentally preparable strongly basic anion exchange resins may be effectively employed in carrying out our invention. From a theoretical standpoint, an organic substance of polymer structure having a strongly ionizable active group, such as a quaternary ammonium type, and which is insoluble in most solvents is effective for the adsorption of free tocopherols. Anion exchange liquids and anion exchange films can, therefore, also be utilized in our invention.

Some examples of commercially available basic anion exchange resins are Type I resins, such as Amberlite IRA-400, 401, 402, 405, 425, Dowex 1—series as X-1, X-2, X-4, Dowex 21 K, Diaion SA-100, 101, Duolite 42 LC, Permutit S-1 etc. and Type II resins, such as Amberlite IRA-410, 411, Dowex 2 X series as X-4, X-8, Diaion SA-200, 201, Duolite 40 LC, Permutit S-2 etc. All of them can be effectively utilized for the purposes of our invention.

The ion exchange treatment can be carried out in either a column wise or a batch wise method, but usually column wise operation is preferred. In the case of column wise operation, both up flow and down flow systems are effective.

The commercially available strongly basic anion exchange resins are sold usually as the (Cl-) anion type. In the present invention it is preferable that they be converted, before use, to the (OH-) anion type by treating them with alkali metal hydroxide solutions, potassium hydroxide and sodium hydroxide preferably being employed. The OH-type strongly basic anion exchange resins are the most effective and satisfactory in the present invention because of their strong adsorption capacity for free tocopherols and because of the industrial and economical availability of alkali metal hydroxides. Aqueous or alcoholic alkali metal hydroxide solutions are used for this purpose. Other solvents such as those used as the adsorption solvent, for example, the lower monohydric alcohol-nonpolar organic solvent mixture, can also be used.

The strongly basic resins thus converted to the (OH-) anion type are then washed completely with distilled water or with the same solvent as that used in the (Cl-) to (OH-) conversion in order to remove excess alkali metal hydroxide from the resin. When an aqueous alkali metal hydroxide solution is used for the conversion, after the complete washing off of the excess alpha metal hydroxide from the resin, a solvent exchange process is carried out in order to exchange the water in the resin with a solvent or solvent mixture corresponding to that employed as the adsorption solvent.

The OH-type anion exchange resins thus obtained are now prepared for the treatment of the oil-solvent mixture. In this treatment flow rate has little influence on the adsorption capacity of free tocopherols. After the resin has been contacted with the oil-solvent mixture, the resin on which the tocopherols are adsorbed is then washed, preferably with the same solvent as that used in said adsorption process, to remove unadsorbed impurities which will be present in the inter- and intra-resinal spaces. The complete washing operation is necessary in order to obtain highly purified tocopherol concentrates.

In said adsorption process substantially all the tocopherols are adsorbed onto the resin, and the adsorbed tocopherols are held on the resin during said washing process. After the adsorption and washing process, the adsorbed tocopherols are then eluted from the resin.

Any substances which can produce anions and which are soluble in the aqueous polar organic solvent, in the polar organic solvent, or in the mixed solvent of polar or aqueous polar and non polar organic solvents in which most of free tocopherol containing materials are soluble and the free tocopherols are ionizable, can be employed as eluting agents. For example, inorganic acids such as hydrochloric acid, sulphuric acid, and phosphoric acid, organic acids such as formic acid, acetic acid, propionic acid and butyric acid, bases such as sodium hydroxide, potassium hydroxide and ammonia and salts such as potassium arsenite, aluminum chloride, potassium acetate, ammonium cyanate, magnesium bromide and zinc iodide can be used as for the eluting agent. Solutions of from 2 to 10% of eluting agent in the solvent are preferable concentrations. Lower or higher concentrations can also be used. The same solvent employed in the adsorption and washing processes is preferred for use as the solvent for the eluting agent. The eluate from the resin is composed mainly of free tocopherols and also of other acidic impurities which are unidentified.

The solvent in the eluate is then removed. The most simple method is to merely distill the solvent off at ordinary or reduced pressure. When an organic acid, such as acetic acid, is employed as eluting agent, said acid can be easily distilled off under reduced pressure. The residue from the vaporization of the eluate is a highly purified tocopherol product. When a base, such as sodium hydroxide, or an inorganic acid, such as sulphuric acid, is used as the eluting agent, the eluate is initially neutralized with an acid or a base, the solvent is distilled off, the residue thus obtained is dissolved in common fat solvents such as ethyl ether and benzene, the solution is washed with water, dried with a dehydrating agent and the solvent is distilled off. The residue thus obtained is a highly purified tocopherol product. The use of an easily and simply removable eluting agent, such as acetic acid, is most preferable.

A more purified tocopherol material product can be obtained by chromatographic operation using different eluting solutions in which gradient concentrations of an eluting agent and combinations of different eluting agents may be employed. For example, strongly basic resins on which tocopherols and some acidic organic impurities have been adsorbed can be first treated with an eluting agent comprised of an aqueous lower monohydric alcohol solution containing sodium hydroxide at low concentration and then treated with an eluting agent containing acetic acid. The first eluate contains little tocopherol and the second eluate contains substantially all the tocopherol adsorbed on the resin.

Chromatographic operations can also be carried out by a single eluting agent. For example, when acetic acid is used as an eluting agent, the first and the last portions of the eluate contain tocopherols at a relatively low purity and the middle portion contains tocopherols at a higher purity.

Resins used in the present invention can be regenerated with alkali metal hydroxide solutions, thus converting the resin into OH-type, and repeatedly used for the purification and concentration of tocopherol containing materials. Because the strongly basic anion exchange resin can be effectively used for a great many cycles, the process of the present invention offers a very excellent and cheap procedure for the purification and concentration of tocopherol containing materials.

As mentioned above, the application of the ion exchange treatment process of the present invention to the purification and concentration of the tocopherol containing materials has a great many advantages as follows:

Firstly, because the adsorption of the tocopherols on the strongly basic anion exchange resins is very specific and selective, provided that free fatty acids are preliminarily removed from the original oils, highly purified tocopherol products, the purity thereof being usually from 60 to 80%, are obtainable in good yields, usually from 85 to 95%, from crude original oils having a low tocopherol content.

Secondly, the adsorption capacity per unit volume or unit weight of the strongly basic anion resins is exceedingly large compared with inorganic adsorbents which have heretofore been used for the adsorption of tocopherols, such as alumina, acid treated alumina, aluminium hydroxide, calcium phosphate, magnesium oxide, zinc carbonate etc.

Thirdly, the reproducibility of the results with the strongly basic resins in the present invention is much higher than with known inorganic adsorbents, Fourthly, the simple and easily regenerable property of the ion exchange resins makes it possible to repeat the cycle of the operation a great many times and this reduces the cost of the process.

The application of our invention to many kinds of tocopherol containing materials, namely, natural glyceride oils, deodorizer sludges derived therefrom, partially concentrated tocopherol products, and synthetically and semisynthetically prepared tocopherol products will be described hereinafter.

It has heretofore been recognized that natural glyceride oils such as soya bean oil, cotton seed oil, fish liver oils and the like include as their main constituent glycerides of the higher fatty acids, but they also contain free fatty acids, sterols, tocopherols, and many other constituents. It is to be understood that the glycerides of the higher fatty acids, which are the main constituent of the crude vegetable and animal oils, are present as a complex mixture of glycerides of a number of fatty acids which differ in the degree of unsaturation and the number of carbon atoms. Regardless of these differences, these glycerides are not adsorbed on the strongly basic anion exchange resins. The resin does not effect any chemical changes, such as saponification, which would result in the liberation of glycerin and free higher fatty acids which would be adsorbed much more strongly on the resins than the free tocopherols. If this occurred, it would decrease the purification and concentration of the free tocopherols adsorbed on the resin. Therefore, the tocopherols in the vegetable and animal oils, in which glycerides are contained as their main constituent, can be effectively purified with the resin treatment process of the present invention, if the free fatty acids present in the vegetable and animal oils are preliminarily removed.

The other constituents, such as sterols, glycerin, hydrocarbons, waxes, higher alcohols, pigments, and polymerized organic substances produced from ketones and aldehydes, are substantially non-ionizable constituents. These constituents and neutral and basic substances which are also contained in the common vegetable and animal oils are, therefore, not adsorbed on the strongly basic resins. These substances are collected in the unadsorbed fraction. The strongly basic resins used in the invention adsorb selectively only free tocopherols and small amounts of some other acidic substances.

Deodorizer sludges, which are the best source of tocopherols, have high contents of free higher fatty acids, usually in the amount of 30 to 60%. It is, therefore, very important and necessary, as a preliminary treatment before the resin treating process, to remove substantially all free fatty acids by some economically and industrially available method, from such materials.

Many different methods of eliminating free fatty acids from deodorizer sludges and original crude vegetable and animal oils are known and all these methods can be utilized in the present invention. For example, the removal of free fatty acids from these oils can be carried out by dissolving the oils in a solvent, such as monohydric alcohols as methyl alcohol, ethyl alcohol and isopropyl alcohol, and hydrocarbons as petroleum benzine, ligroin, and acetone, and then cooling the oil-solvent mixture to −20° C. or lower temperature, and then separating free higher fatty acids and other impurities present in the original oils. The solvent is then removed by filtration or decantation at low temperature, and distilled off. The residue, however, usually still contains appreciable amounts of free fatty acids, and requires further and more complete elimination of them before the resin treatment of the present invention.

Another method of eliminating said free fatty acids is alkali refining or neutralization treatment. This can be accomplished by dissolving the original oil in a common fat solvent, such as diethyl ether, petroleum ether, benzine, ligroin, benzene, etc., and treating the oil-solvent mixture with aqueous alkali solution, such as sodium hydroxide or potassium hydroxide to remove free fatty acids as soaps which are soluble in water, and then washing the oil-solvent mixture with water. The solvent phase is separated from the water phase, dried with dehydrating agents and distilled at ordinary or reduced pressure to remove solvent. The residue thus obtained is completely free from fatty acids.

Another method is saponification by which free higher fatty acids and glycerides are satisfactorily removed without any appreciable desctruction of tocopherols if the saponification is carried out in the presence of an inert gas, such as nitrogen or carbon dioxide, to avoid oxidation of tocopherols.

The oils treated by said neutralization and saponification treatments are completely free from free fatty acids usually and are ready for the resin treatment. These treatments require, however, great amounts of solvent and in some cases emulsions occur in the solvent phase and the soap containing water phase. Emulsions decrease greatly the recovery of tocopherols. The yield of tocopherols in these treatments is commonly from 60 to 70%.

We have also found a more satisfactory and new process for pretreatment which comprises converting free fatty acids and glyceride fatty acids into neutral esters which have no tendency to adsorb on the strongly basic anion exchange resins. These esters will stay in the unadsorbed fraction with the other impurities and they will have no influence on the tocopherol adsorption capacity of the resins. This pretreatment process of the present invention is a most excellent and effective one for the treatment of tocopherol containing materials having high free fatty acids contents, such as deodorizer sludges.

Said esterification of the free fatty acids in tocopherol containing materials can be easily attained by many well known and commonly used esterification methods. For example, the fatty acid esters of lower monohydric alcohols containing one to six carbon atoms can be obtained by causing tocopherol containing materials to react with a lower monohydric alcohol, preferably in the presence of a catalyst such as a mineral acid, hydrochloric acid being a typical esterification catalyst, in the amount of about 1 or 2% by weight of the reaction mixture. Lower or higher concentrations of an acid or other esterification catalysts can be used. After the removal of esterification catalyst from the reaction mixture by washing with water, the acid value of the original crude oils will be found to be 2 or less. The acid value of deodorizer sludges commonly is from 60 to 120 before the treatment. This shows that most of the free fatty acids have been converted into neutral esters. Deodorizer sludges thus treated can be immediately subjected to the ion exchange resin treatment of the present invention. In a similar manner, fatty acid esters of higher monohydric alcohols, such as cetyl alcohol and oleyl alcohol, can be obtained by subjecting the original crude oils to refluxing with benzene in the presence of esterification catalyst, such as p-toluene sulphonic acid, and distilling off water produced by the esterification azeotropically with benzene from the reaction mixture to promote esterification. Monoglycerides or diglycerides can be obtained by causing the original crude oils to react with glycerine in the presence of potassium carbonate, and fatty acid esters of aromatic alcohols, in the presence of polyphosphoric acid as esterification catalyst. The process of esterification and the subsequent resin treatment according to the present invention is superior in its overall yield of tocopherol material to that comprising neutralization or saponification and then subsequent resin treatment.

Tocopherol concentrates obtained by molecular distillation can also be the original tocopherol containing material treated by the resin according to the present invention. Because substantially the entire tocopherol fraction distills at a higher temperature than free fatty acids, a tocopherol fraction obtained can be obtained which is almost free from free fatty acids, and this can be further purified with the ion exchange resins. If the separation of esterified crude oils, in which the free fatty acids are converted into esters of the lower monohydric alcohols that distill at lower temperatures than their free form, is effected on high vacuum stills, such as falling film molecular stills, centrifugal molecular stills, vacuum rectifying stills of rotating cold-core type and the like stills, the tocopherol fraction may be more distinctly separated from the fatty acids compositions than is the case with unesterified crude oils containing free fatty acids and is a better material for use in our procedure. The purity of tocopherols obtained by the process which comprises molecular distillation followed by resin treatment is higher than is the case where esterification, or neutralization, or saponification is used prior to the subsequent resin treatment because molecular distillation can remove some acidic and resin adsorbable substances other than tocopherols. On the other hand the over-all yield of tocopherols in the process comprising molecular distillation and then subsequent resin treatment is lower than the process comprising esterification and subsequent resin treatment.

Therefore, the process comprising molecular distillation and subsequent resin treatment can be used to obtain tocopherol concentrates of higher purity.

Tocopherol concentrates obtained by other well known purification methods, such as solvent extraction using a counter current method, concentrated sulphuric acid treatment to remove hydrocarbons, selective adsorption using inorganic adsorbents and combinations thereof, or the saponification process or the molecular distillation process, can also be used and the product thereof subjected to the further resin treatment process of our invention if the free fatty acids in these tocopherol containing materials are previously removed or converted to esters.

Semisynthetically prepared alpha-tocopherol products or intermediates can also be effectively purified with the strongly basic anion exchange resin treatment process of this invention.

Natural tocopherols which exist in vegetable glyceride oils, such as soybean oil, cotton seed oil, wheatgerm oil and the like oils, and which exist in more concentrated form in deodorizer sludges, are generally composed of mixtures of several tocopherols. There have heretofore been found in nature seven types of tocopherols, namely, alpha-, beta-, gamma-, delta-, epsilon-, zeta- and eta-tocopherol. Of these, alpha tocopherol has the most powerful biological vitamin E activity. The other tocopherols, which may be called by the generic term of "non-alpha-tocopherols," have weaker vitamin E activity but stronger anti-oxidant activity than alpha-tocopherol. Therefore, for the stronger vitamin E activity, mixed tocopherol compositions of natural glyceride oils, deodorizer sludges derived therefrom, or tocopherol concentrated products thereof, should be converted to alpha-tocopherol by such methylation techniques as formylation and reduction, halomethylation and reduction, hydroxymethylation and reduction, aminomethylation and reduction and similar methods, by which the aromatic groups of non-alpha-tocopherols are replaced with methyl groups. Alpha-tocopherol products thus prepared semisynthetically from non alpha-tocopherols containing materials can also be very similarly purified with the ion exchange treatment of the present invention. Alpha-tocopherol intermediates produced by the methylation of materials containing non-alpha tocopherols, such as 7-formyl-(or halomethyl, hydroxymethyl, etc.)-beta tocopherol, 5-formyl-(or halomethyl, hydroxymethyl, etc.)-gamma tocopherol and 5,7-di-formyl (or dihalomethyl, di-hydroxymethyl, etc.) delta tocopherol, can also be adsorbed on the strongly basic resins in the same fashion as alpha-tocopherol, non-alpha-tocopherols and the other tocopherols. Therefore, the process of the present invention in this case comprises subjecting the crude source oils, which are commonly composed of alpha-tocopherol and non alpha-tocopherols and have previously been made free of free fatty acids, to a substitution reaction so as to convert the aromatic groups of non alpha-tocopherols into formyl, halomethyl, hydroxymethyl or similar radicals, and treating the thus obtained intact alpha tocopherol and alpha-tocopheral containing intermediates with the strongly basic resins, and of reducing subsequently intact alpha-tocopherol containing intermediates to alpha tocopherol concentrate. Similarly, tocopherol concentrates which have been obtained by the treatment of the strongly basic resins from natural glycerides oils, deodorizer sludges derived therefrom and the other tocopherol products are also composed of alpha-tocopherol and non alpha tocopherols and can, of course, be converted by the above methylation techniques into alpha-tocopherol intermediate concentrates or into alpha-tocopherol concentrates.

Both the mixed tocopherol concentrates and semisynthetically prepared alpha tocopherol concentrates obtained with the anion exchange resin treatment process of our invention from natural sources can thereafter be further purified, if necessary, by any of the well known means of purification, such as molecular distillation, solvent extraction, crystallization or combination thereof.

Semisynthetically prepared, alpha-tocopherol analogous concentrates (such as 7-ethyl-beta-tocopherol, 5-ethyl-gamma-tocopherol, 5,7-diethyl-delta-tocopherol and similar tocopherols), which have relatively higher biological vitamin E activity than original non alpha-tocopherols, and alpha-tocopherol analogous intermediate concentrates (such as 7-acetyl (or haloethyl, hydroxyethyl, etc.)-beta tocopherol, 5-acetyl (or haloethyl, hydroxyethyl, etc.)-gamma tocopherol, 5,7-diacetyl (or dihaloethyl, dihydroxyethyl, etc.)-delta tocopherol and similar tocopherols), may also be obtained from non-alpha tocopherols in a similar way as mentioned above with respect of the case of semi-synthetically prepared alpha-tocopherol with the strongly basic anion exchange resin process of the present invention from crude source oils by any of the following processes: namely, the process of acetylation (or haloethylation, hydroxyethylation, etc), reduction and resin treatment; the process of acetylation (or haloethylation, hydroxyethylation, etc.), resin treatment and reduction; the process of resin treatment, acetylation (or haloethylation, hydroxyethylation, etc.) and reduction. From non alpha-tocopherols, semisynthetically prepared alpha tocopherol analogous concentrates with higher alkyl groups, such as propyl and butyl, will be also obtained with the ion exchange resin treatment following the procedures above mentioned.

The purification of synthetically prepared tocopherol containing materials can, of course, be effected according to our invention. Synthetic alpha tocopherols are obtained by condensing trimethyl hydroquinone with phytol, isophytol, phytyl halides, phytadiene or similar substances in the presence of condensation catalysts, such as anhydrous zinc chloride or boron fluoride etherate. The resulting condensation product is commonly composed mainly of alpha-tocopherol and of impurities, some of which are derived from the phytol portion which is commonly prepared from natural sources. Therefore, most of the synthetic alpha-tocopherol products can be effectively further purified with the ion exchange treatment of the present invention.

The strongly basic anion exchange resin treatment process of our invention for tocopherol containing materials can also be used for the recovery of the tocopherols from residual oils resulting from molecular distillation. These residual oils are usually composed of triglycerides, polymerized substances of high molecular weight, pigments and tocopherol material and it is very difficult to recover tocopherols from these residual oils even by multiple-cycle molecular distillation methods. Effective recovery of tocopherol material from these residual oils can be easily accomplished for both natural and synthetic oils with the process of our invention.

*Example 1*

Some vegetable glyceride oils, after removing the free fatty acids by neutralization with sodium hydroxide from glyceride oil compositions, were subjected to the anion exchange resin procedure. The process was carried out at room temperature (20° C.–25° C.). A glass column was used, 2 cm. in diameter and 60 cm. in height. The amount of the anion exchange resin in the column was 100 cc. as (Cl-) anion type. All the hereinafter mentioned parts by volume refer to the volume of the anion exchange resin. One part by weight of glyceride oil was initially dissolved in one part by volume of the preferred adsorption solvent, passed through the column and washed with 1.5 parts by volume of the adsorption solvent. Then the tocopherol fraction was eluted with 3 parts by volume of a solution of 5% acetic acid in the same solvent as used in the adsorption process, and then eluate was collected. The solvent and acetic acid were distilled off under reduced pressure. The purity of the tocopherols in the residues was determined by Emmerie-Engel assay method.

The results are shown by the following table.

| Expl. No. | Glyceride oils | | | Ion exchange treatment | | Tocopherol concentrate | |
|---|---|---|---|---|---|---|---|
| | Vegetable oils | Wt. of oil (kg.) | Toc. (percent) | Anion exchange resin | Adsorption and eluation solvent (volume ratio) | Toc. (percent) | Yield (percent) |
| 1 | Soy bean | 2.25 | 0.152 | Dowex 2X-4 | E:iPe (2:1) | 74.8 | 88 |
| 2 | do | 3.58 | 0.152 | Dowex 1X-1 | E:Bz (4:3) | 71.2 | 92 |
| 3 | Cotton seed | 4.70 | 0.089 | Amberlite IRA-401 | E:Bz (4:3) | 69.6 | 94 |
| 4 | Rice | 5.65 | 0.078 | do | iP:l (4:1) | 73.5 | 90 |
| 5 | Cotton seed | 5.20 | 0.092 | Duolite 42LC | E:n-H (4:3) | 69.3 | 91 |
| 6 | Wheat germ | 2.41 | 0.175 | Diaion SA-101 | E:l (4:3) | 68.8 | 93 |

Abbreviations: Toc., tocopherol; E, ethyl alcohol; Bz, benzene; iPe, isopropyl ether; iP, isopropyl alcohol; l, ligroin; n-H, normal hexane.

Example 2

A partially purified tocopherol product was obtained by subjecting a deodorizer sludge, which was derived from soy bean oil and composed of 10.8% tocopherol as determined by the Emmerie-Engel assay method, to the usual saponification process. Sterols were removed by dissolving the saponified deodorizer sludge into acetone, chilling and then filtering off the sterols. The tocopherol product thus obtained showed by the Emmerie-Engel assay method a tocopherol concentrate of 27.5%. This sample was then treated with anion exchange resin. 520 g. sample was dissolved in 700 cc. of ethyl alcohol-benzene mixture (volume ratio being 4:1) and the solution contacted with one liter of the OH type Dowex 1X-1 resin. The resin was then washed with about 1.7 liters of the same solvent and then eluted with about 3 liters of a solution of 3% formic acid in the same solvent. The eluate contained 76% tocopherol, by the Emmerie-Engel assay method. The tocopherol yield was 94%.

Example 3

12.0 kg. of deodorizer sludge from soy bean oil, the tocopherol concentration being 10.3% was dissolved in 28 liters of methyl alcohol-benzene mixture (the volume ratio being 20:3), chilled to 5° C. and separated from the crystallized sterols by centrifugal filtration. To the filtrate was added 32 liters of benzene and 24 liters of aqueous sodium hydroxide solution. The benzene phase was separated from about 50% aqueous methyl alcohol solution phase containing soap, washed with water, dried and the solvent was distilled off. 4.55 kg. of residue was obtained. This showed the tocopherol content of 18.5% and acid value of 1.02. This was then treated with ion exchange resin.

500 g. of the sample was dissolved into one liter of ethyl alcohol and the solution was contacted with one liter of Dowex 2X-4 resin in a glass column of 5 cm. in diameter and 80 cm. in height. The column was then washed with 1.5 liters of ethyl alcohol. The tocopherol fraction was then eluted from the resin with a solution of 4% acetic acid in ethyl alcohol. Each 500 cc. portions of the eluate was successively collected and the solvent and acetic acid were distilled off under reduced pressure. The tocopherol content of each portion was determined by the Emmerie-Engel assay method and the results are listed below. The same procedure was followed, but not chromatographically, and it was found that the purity of the tocopherol in the residue was 72.5%.

| Eluate number | Weight of residue (g.) | Purity of tocopherol percent |
| --- | --- | --- |
| 1 | 12.0 | 66.5 |
| 2 | 13.1 | 80.8 |
| 3 | 40.2 | 76.6 |
| 4 | 29.5 | 73.5 |
| 5 | 20.7 | 64.5 |
| 6 | 6.7 | 48.5 |

Example 4

A deodorizer sludge, which was derived form soy bean oil, was used as the original oil. This sludge was composed of about 33.8% free fatty acids, which was calculated from the acid value and mean molecular weight of the free fatty acids of soy bean oil, namely, 279, 7.2% tocopherol and of other substances such as sterols, glycerides, hydrocarbons etc. To 1.0 kg. of the sludge was added 500 cc. methyl alcohol, 10 cc. concentrated sulphuric acid and 200 cc. benzene and the mixture was refluxed for 3 hours. After the esterification, to the reaction mixture was added 1.3 liters of benzene and 500 cc. water. The benzene phase was separated from about 50% aqueous methyl alcohol phase, washed repeatedly with water, dried on sodium sulphate and then the solvent was distilled off. 1015 g. of the residue was obtained, the tocopherol concentration being 7.0%, by the Emmerie-Engel assay method, and the acid value was 0.31. The tocopherol yield was 97%.

1003 g. of the residue was dissolved in one liter of ethyl alcohol and the solution was treated with 800 cc. OH type of Dowex 1X-1 resin. Methyl esters of fatty acids were collected in the unadsorbed fraction and had no harmful effects on the adsorption of tocopherol material on the anion exchange resin. The tocopherol fraction on the resin column was, after washing with 1.5 liters of ethyl alcohol, eluted with 2.5 liters of a solution of 5% acetic acid in ethyl alcohol. The tocopherol concentrate was obtained after the vaporization of the solvent and acetic acid. The purity of the tocopherol in the concentrate was 75.0%, by the Emmerie-Engel assay method, and the tocopherol yield was 95%.

Example 5

To 350 g. of a deodorizer sludge, which was derived from cotton seed oil, and composed of 4.6% tocopherol and of 41.5% free fatty acids (acid value 82.4), was added 190 g. of cetyl alcohol and 2 g. of p-toluene sulphonic acid. The mixture was refluxed under continuous supply of benzene to remove water from the reaction mixture by azeotropic distillation. The reaction mixture was then washed with water, dried and the solvent was distilled off. 525 g. of residue, in which the tocopherol concentration was 2.9% and acid value 0.08, was obtained. The tocopherol yield was 95%. The residue was then dissolved in one liter ethyl alcohol-benzene mixture (the volume ratio being 7:3) and then treated with 230 cc. Duolite 42 LC resin and the treatment was carried out as Example 4. The content of tocopherol in the concentrate was 69.9% by Emmerie-Engel assay method and the yield of tocopherol was 97.3%.

Example 6

A deodorizer sludge, which was derived from cottonseed oil, was treated in a falling film molecular still. The main distillate, from which most of the free fatty acids had been removed and which had a concentration of tocopherol of 31.7% by Emmerie-Engel assay method, was treated with anion exchange resin.

7.68 g. of the sample was dissolved in 50 cc. ethyl alcohol, chilled at low temperature to crystallize out sterols which were filtered off and then the filtrate was contacted with 30 cc. Duolite 42 LC resin. The resin column was washed with 50 cc. ethyl alcohol. The tocopherol fraction was eluted from the resin with 200 cc. of a solution of 5% acetic acid in ethyl alcohol. 2.5 g. of the residue obtained from the eluate showed a tocopherol content of 88%.

Example 7

7.5 g. of the main distillate of the distillation operation of Example 6 was dissolved in 75 cc. ethyl alcohol-n-butyl alcohol mixture (volume ratio being 4:1) and were contacted with 30 cc. Dowex 1X-2 resin. The resin was washed with 50 cc. of the same solvent and the tocopherol was eluted from the column with 100 cc. of a solution of 5% oxalic acid in n-butyl alcohol. 2.3 g. of tocopherol concentrate was obtained, the tocopherol purity of which was 85.0% by Emmerie-Engel determination method.

Example 8

220 g. of a neutralized deodorizer sludge from cottonseed oil prepared as described in Example 3, which contained 10.5% tocopherol, was dissolved in 300 cc. of ethyl alcohol-benzene mixture (the volume ratio being 7:3) and the solution was passed through a glass column of 2.5 cm. in diameter and 100 cm. in height, filled with 300 cc. of Dowex 1X-2 resin. The column was then washed with 430 cc. of the same solvent, and the filtrate and washings were combined as the unadsorbed fraction. The column was then treated with 600 cc. of a solution of 0.5% potassium hydroxide in an ethylalcohol-benzene mixture (the volume ratio being 9:1). The tocopherol fraction was then eluted from the column with one liter of a solution of 3% acetic acid in ethyl alcohol.

The data on each fraction is as follows.

|  | Unadsorbed fraction | Alkali-eluted fraction | Acid-eluted fraction |
|---|---|---|---|
| Weight of oil (g.) | 175 | 38.0 | 11.2 |
| Tocopherol concentration (percent) | 0.62 | 29.4 | 92.5 |
| Concentration ratio | 0.059 | 2.8 | 8.8 |

*Example 9*

An ether solution of 100 g. neutralized deodorizer sludge obtained as described in Example 3 (18.5% total tocopherols by Emmerie-Engel assay, consisting of approximately 10% alpha; 60% gamma- and 30% delta-tocopherol by chemical assay) was provided. Hydrogen chloride gas was bubbled through the solution for about 10 minutes at room temperature, 60 cc. of aqueous hydrochloric acid and 12 cc. of formalin solution were added and stirred vigorously for 45 minutes with hydrogen chloride gas passing through the mixture. The ether phase was then separated, washed with water and dried and the solvent was evaporated. 96 g. residue was obtained. The residue contained 14.3% total tocopherols by Emmerie-Engel assay consisting of approximately 10% alpha-, 85% chloromethyl- and 5% unreacted non alpha-tocopherol. 90 g. residue was dissolved in 90 cc. of methylalcohol-benzene mixture (the volume ratio being 3:2) and contacted with 200 cc. Dowex 1X–1 resin. The resin was washed with 400 cc. of the same solvent and eluted with 900 cc. of a solution of 6% acetic acid in methyl alcohol. The residue from the eluate showed 68% tocopherol concentration by Emmerie-Engel assay method and the tocopherol yield was 93%.

*Example 10*

250 g. of the tocopherol concentrate (64% total tocopherols by Emmerie-Engel assay consisting of approximately 10% alpha-, 60% gamma- and 20% delta-tocopherol), concentrated by saponification and molecular distillation, was dissolved in 2 liters of 0.6% alcoholic potassium hydroxide solution. Nitrogen was bubbled through the solution, the temperature of the solution was raised to 60° C. and 800 cc. of formalin was added to the solution. The reaction mixture was maintained at 60° C. for 2 hours while bubbling nitrogen therethrough and then was extracted with ether. The extract was washed with water until neutral, dried and the solvent was distilled off. The residue thus obtained is hydroxymethyl tocopherol product. The Emmerie-Engel concentration of the residue was 52% and the residue was composed approximately of 10% alpha-, 80% hydroxymethyl- and 10% unreacted non alpha-tocopherol by chemical assay.

25 g. of the hydroxymethyl tocopherol product was dissolved in 50 cc. of isopropyl alcohol and treated with 200 cc. of Dowex 1X–1 resin. The resin was washed with 200 cc. isopropyl alcohol and eluted with 600 cc. of a solution of 5% acetic acid in isopropyl alcohol. The residue from the eluate showed a hydroxymethyl tocopherol concentration of 87% by Emmerie-Engel assay method, yield: 92%.

*Example 11*

The chloromethyl tocopherol containing crude oil, obtained as described in Example 9, was converted to alpha-tocopherol by reduction with hydrochloric acid and zinc dust. 160 g. of the thus semisynthetically prepared alpha-tocopherol containing crude oil (Emmerie-Engel concentration of 13.8% consisting approximately of 93% alpha and 7% non alpha-tocopherol by chemical assay) was dissolved in 200 cc. of isopropyl alcohol and treated with 300 cc. Diaion SA–101 resin. The resin was washed with 350 cc. isopropyl alcohol and eluted with 900 cc. of a solution of 5% formic acid in isopropyl alcohol. Residue from the eluate showed a tocopherol concentration of 72% by Emmerie-Engel assay method and the yield was 89%.

*Example 12*

Synthetically prepared dl alpha tocopherol product was prepared by condensing trimethylhydroquinone with phytyl bromide which is obtained by the bromination of phytol purified from natural sources. 10 g. of the synthetic dl alpha tocopherol was dissolved in 50 cc. ethyl alcohol and was contacted with 100 cc. Diaion SA–201 resin. The resin was then washed with 100 cc. of ethyl alcohol. The combined unadsorbed fraction of filtrate and washings contained no tocopherol and 1.5 g. of unadsorbed substances. The resin was eluted with 300 cc. of a solution of 3% acetic acid in ethyl alcohol. 8.4 g. residue from the eluate was obtained, the purity of the tocopherol being 87% by Emmerie-Engel determination method.

*Example 13*

This example shows the recovery of tocopherol from the residual oil fraction obtained by the molecular distillation of a natural tocopherol product at 250° C. and $10^{-3}$ mm. Hg. The residual oil contained tocopherol in a concentration of 8.3% and was coloured dark brown.

1.05 kg. of the residual oil was dissolved in one liter of ethyl-alcohol-benzene mixture (the volume ratio being 4:1) and the solution was contacted with 900 cc. Dowex 1X–1 resin. The resin was washed with 1.2 liters of the same solvent and was eluted with 2.6 liters of a solution of 5% acetic acid in the same solvent. After the vaporization of the solvent and acetic acid, 175 g. of the residue was obtained. This tocopherol concentrate showed a tocopherol content of 47.3% and the yield was 94.8%.

What we claim is:

1. The process of preparing tocopherol concentrates from tocopherol containing materials, which comprises dissolving a tocopherol containing material in a polar organic solvent, contacting this solution with a strongly basic anion exchange resin in hydroxyl form to adsorb substantially all of the tocopherols on said resin, eluting the adsorbed tocopherols by passing an acidic eluting solution through said resin, said acidic eluting solution comprising an acid eluting agent and a polar organic solvent, and obtaining a tocopherol concentrate from the resulting eluate.

2. The process of preparing tocopherol concentrates from tocopherol containing materials which also contain substantial amounts of free fatty acids, which comprises treating the tocopherol containing material to free same of the free fatty acids, dissolving the resulting composition in a polar organic solvent, contacting this solution with a strongly basic anion exchange resin in hydroxyl form to adsorb substantially all of the tocopherols on said resin, eluting the adsorbed tocopherols by passing an acidic eluting solution through said body, said acidic eluting solution comprising an acid eluting agent and a polar organic solvent, and obtaining a tocopherol concentrate from the resulting eluate.

3. The process as claimed in claim 1 in which the tocopherol containing materials are selected from the group consisting of natural vegetable oils and deodorizer sludges.

4. The process as claimed in claim 1 in which said polar organic solvent is a lower monohydric alcohol containing from 1 to 4 carbon atoms.

5. The process as claimed in claim 1 in which said acid eluting agent is acetic acid.

References Cited in the file of this patent

UNITED STATES PATENTS

| | | |
|---|---|---|
| 2,327,766 | Cawley | Aug. 24, 1943 |
| 2,349,276 | Hickman | May 23, 1944 |
| 2,379,420 | Baxer et al. | July 3, 1945 |
| 2,486,540 | Hickman | Nov. 1, 1949 |
| 2,704,764 | Mattikow et al. | Mar. 22, 1955 |

OTHER REFERENCES

Nachod et al.: Ion Exchange Technology, page 17, Academic Press Inc., New York (1956).